United States Patent [19]

Sood

[11] Patent Number: 4,724,134
[45] Date of Patent: Feb. 9, 1988

[54] PRODUCTION OF TAILOR-MADE PARTICLE SIZE DISTRIBUTIONS OF SUBSTANTIALLY SPHERICAL METAL HYDROXIDE/OXIDE PARTICLES COMPRISING SINGLE OR MULTIPLE HYDROXIDES BY HYDROLYSIS OF ONE OR MORE METAL ALKOXIDE AEROSOLS

[75] Inventor: Ajay Sood, Ross Township, Allegheny County, Pa.

[73] Assignee: Aluminum Company of America, Pittsburgh, Pa.

[21] Appl. No.: 789,437

[22] Filed: Oct. 21, 1985

Related U.S. Application Data

[63] Continuation-in-part of Ser. No. 742,770, Jun. 10, 1985.

[51] Int. Cl.[4] .................. C01B 13/14; C01F 7/02; C01F 7/30
[52] U.S. Cl. ............................ 423/592; 423/593; 423/600; 501/134; 501/153; 501/127
[58] Field of Search ............... 423/592, 593, 630; 501/134, 153, 127

[56] References Cited

U.S. PATENT DOCUMENTS

| 3,403,001 | 9/1968 | Mas et al. ................ 23/202 |
| 3,406,012 | 10/1968 | Rahn ...................... 23/202 |
| 3,647,374 | 3/1972 | Nomura et al. ............ 423/630 |
| 3,663,283 | 5/1972 | Hebert et al. ............. 106/288 |
| 3,914,396 | 10/1975 | Bedetti et al. ............ 423/613 |
| 4,117,106 | 9/1978 | Bendig et al. ............. 423/630 |
| 4,241,042 | 12/1980 | Matijevic et al. .......... 423/610 |
| 4,387,085 | 6/1983 | Fanelli et al. ............ 423/630 |
| 4,532,072 | 7/1985 | Segal ..................... 423/630 |
| 4,543,341 | 9/1985 | Barringer et al. .......... 423/593 |

FOREIGN PATENT DOCUMENTS 84301275.8 5/1984 European Pat. Off.
2070579B 1/1983 United Kingdom.

OTHER PUBLICATIONS

Centro Ricerche Novara, Istituto Guido Donegani, "Monodisperse Titanium Dioxide Production: Product and Applications".

*Primary Examiner*—Andrew H. Metz
*Assistant Examiner*—Chung K. Pak
*Attorney, Agent, or Firm*—Andrew Alexander; John P. Taylor

[57] ABSTRACT

The invention comprises high purity substantially spherical metal oxide particles having one or more predominant particle sizes formed from one or more metal alkoxides. In one embodiment there is disclosed multimodal particle size distributions of such substantially spherical metal hydroxide particles while a second embodiment describes the formation of such particles using more than one metal alkoxide to form either a mixed metal hydroxide particle or a layered particle comprising a core of a first metal hydroxide and at least one layer of an additional metal hydroxide.

9 Claims, 11 Drawing Figures

SEM of Powder Produced in Turbulent Flow, No Seeding - Run No. 18

SEM of Powder Produced in Turbulent Flow
With Seeding - Run No. 19

PRODUCTION OF TAILOR-MADE PARTICLE SIZE DISTRIBUTIONS OF SUBSTANTIALLY SPHERICAL METAL HYDROXIDE/OXIDE PARTICLES COMPRISING SINGLE OR MULTIPLE HYDROXIDES BY HYDROLYSIS OF ONE OR MORE METAL ALKOXIDE AEROSOLS

CROSS REFERENCE TO RELATED APPLICATION

This application is a continuation-in-part of U.S. Ser. No. 742,770, filed June 10, 1985.

BACKGROUND OF THE INVENTION

1. Field of the Invention

This invention relates to the production of substantially spherical metal hydroxide particles under turbulent flow conditions. More particularly, this invention relates to the production of tailor-made particle size distributions of such particles by vapor phase hydrolysis of an aerosol which contains one or more metal alkoxides.

2. Background Art

Metal oxide and metal hydroxides are useful in the formation of ceramic materials, paint pigments, fire retardants and the like. Of particular interest in the formation of ceramics are spherical, non-agglomerated particles of substantially uniform size because of the possible reduction of sintering time and temperature while increasing mechanical strength. When such particles are of high purity, they are especially useful in the production of ceramic substrates for the semiconductor industry where even trace impurities of certain materials, e.g. heavy metal oxides, such as thorium oxide which emits alpha particles, are highly undesirable.

Methods for the production of substantially spherical metal oxides and hydroxides from the hydrolysis of aerosol formed from metal alkoxides are known. For example, Visca et al in "Preparation of Uniform Colloidal Dispersions of Chemical Reactions in Aerosols: 1. Spherical Particles of Titanium Dioxide", published in the *Journal of Colloid and Interface Science,* Vol. 68, No. 2, February, 1979, at pp. 308–319, discussed the portion of $TiO_2$ spheres of narrow size distribution using titanium alkoxide and $TiCl_4$ starting materials in which the starting material is first evaporated into a gaseous carrier and then condensed onto AgCl seed nuclei in a condensation zone to form an aerosol dispersed in the gas. The aerosol is then hydrolyzed by contact with water vapor to form the spherical particles of $TiO_2$. A similar process is described by the authors in Matijevic et al U.S. Pat. No. 4,241,042.

Ingebrethsen et al in "Particles of Uniform Colloidal Dispersions by Chemical Reactions—2. Spherical Particles of Aluminum Hydrous Oxide", *Journal of Aerosol Science,* Vol. 11, Pergamon Press, 1980, Great Britain, at pp. 271–280, describe the formation of uniform colloidal aluminum hydrous oxide aerosols by hydrolyzing droplets of aluminum sec-butoxide. The use of AgCl nucleating material is again described. Ingebrethsen et al particularly caution about preserving the laminar flow in the hydrolysis zone, indicating, on page 273, that turbulence in the flow caused a broadening of the size distribution of their final solid particles.

The deleterious effect of turbulence in the hydrolysis zone is also discussed in European Patent No. 117,755 where the use of turbulent flow is employed to initially form the aerosol. The turbulent flow is used by the patentees in the aerosol generating stage to form the aerosol by mixing an inert gas stream containing vapor of a hydrolyzable metal compound with a cold inert gas stream. By mixing the two streams in a turbulent flow with a Reynolds number equal to or higher than 1800, an aerosol can apparently be formed without requiring the generation of solid nuclei. The patentees, however, warn that laminar flow must be reestablished in the subsequent hydrolysis zone to reduce the risk of coalescence of the droplets coming from the previous aerosol forming stages.

Formation of an aerosol without the use of seed nuclei is found in the aforementioned Matijevic U.S. Patent (and its U.K. counterpart patent, GB No. 2070579B) at column 3, line 14, to column 4, line 3, under a discussion of homogeneous and heterogeneous nucleation. Conditions of supersaturation are used to produce the self-induced or spontaneous nucleation referred to as homogeneous. However, the patentees state that homogeneous nucleation is more sensitive to temperature, pressure and velocity gradients in a flow system, which results in concentration gradients. Moreover, homogeneous nucleation is said to be more easily affected by contaminants and irregularities in container surfaces. As a consequence, the patentees conclude, it is more difficult to control the particle size in a homogeneous nucleation system.

It is also known to produce such spherical particles under laminar flow conditions from mixtures containing more than one metal alkoxide. Ingebrethsen et al in an article entitled "Kinetics of Hydrolysis of Metal Alkoxide Aerosol Droplets in the Presence of Water Vapor" published in the *Journal of Colloid and Interface Science,* Volume 100, No. 1, July 1984, describe the hydrolysis of aluminum sec-butoxide, titanium ethoxide, and a mixture thereof at Reynolds numbers measured at 74, 50 and 48 in various regions of the apparatus, i.e., under laminar flow conditions.

It would, however, be desirable to be able to produce substantially spherical metal hydroxide or oxide particles having tailor-made particle size distribution of unimodal, bimodal and trimodal sizes of either single hydroxides or mixtures of hydroxides by the hydrolysis of an aerosol formed from metal alkoxide vapor. Particular particle size distributions, for example, are useful in achieving desired physical properties in a ceramic made therefrom while particular blends of metal oxides in ceramics can have utility in electrical applications by changing the resistivity and dielectric properties of the material.

SUMMARY OF THE INVENTION

It is, therefore, an object of the invention to provide substantially spherical particles of metal oxide or hydroxide having a controlled particle size distribution.

It is another object of the invention to produce substantially spherical particles of metal oxide or hydroxide having a controlled particle size distribution while maintaining high production rates under turbulent flow conditions.

It is yet another object of the invention to provide substantially spherical particles of metal hydroxide having a controlled particle size distribution while maintaining high production rates under turbulent flow conditions using more than one metal alkoxide in aerosol form.

It is a further object of the invention to provide substantially spherical particles of metal oxide or hydroxide of unimodal, bimodal or multimodal particle size distribution comprising a core of one metal hydroxide and at least one coating layer thereon comprising at least one other metal hydroxide.

In accordance with the invention, high purity substantially spherical metal oxide particles, having one or more predominant particle sizes, are formed from one or more metal alkoxides. In one embodiment, multimodal particle size distributions are formed from such substantially spherical metal hydroxide particles. In another embodiment, the formation of such particles using more that one metal alkoxide forms either a mixed metal hydroxide particle or a layered particle comprising a core of a first metal hydroxide and at least one layer of an additional metal hydroxide.

These and other objects of the invention will be apparent from the following description and accompanying drawings.

DESCRIPTION OF THE PREFERRED EMBODIMENT

Figure 1:
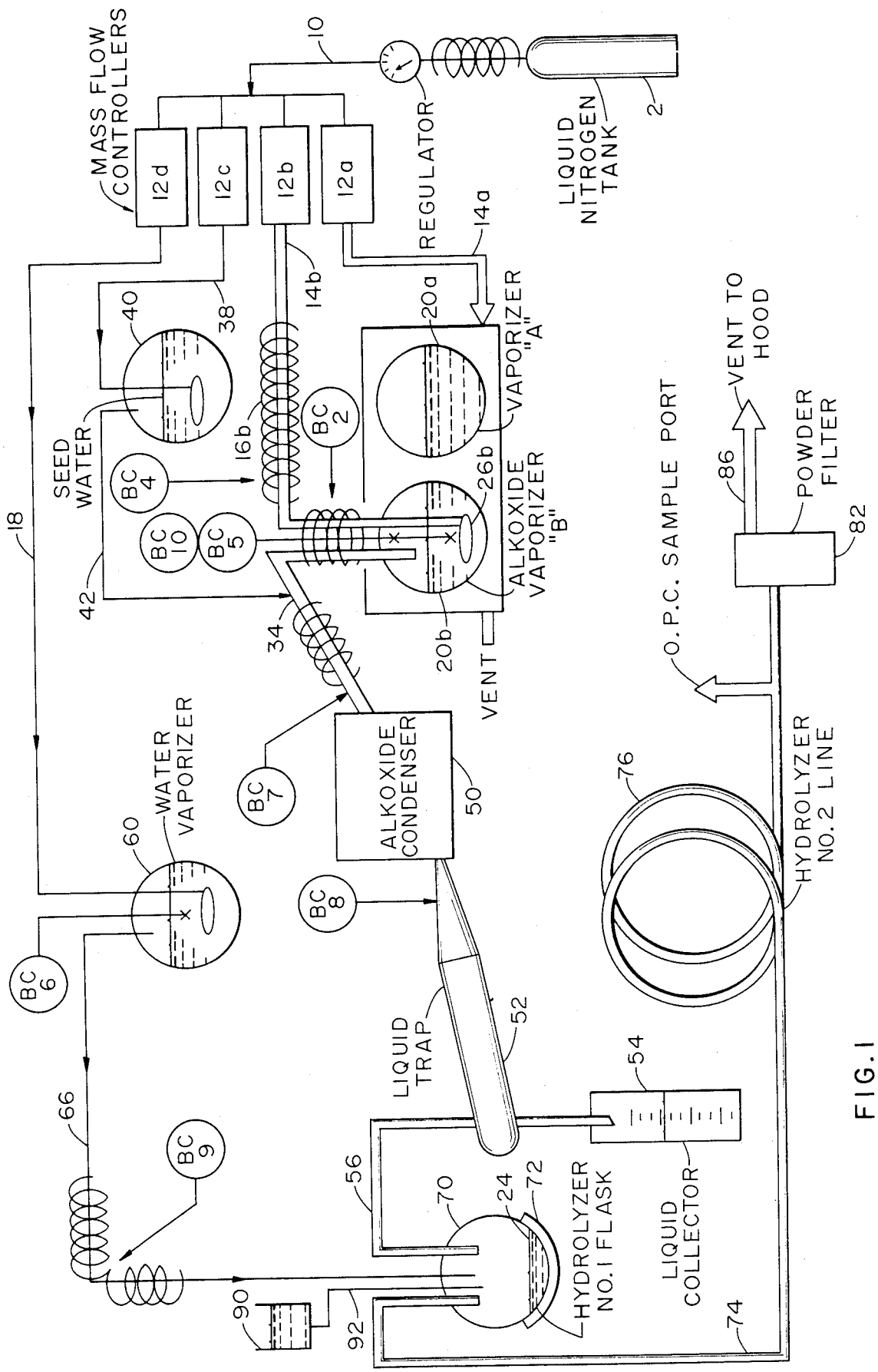
FIG. 1 is a diagrammatic flowsheet illustrating one embodiment of the process of the invention.

The invention provides a mixture of substantially spherical metal hydroxide/oxide particles of at least one predominant particle size containing one or more metal oxides by the hydrolysis of an aerosol containing the corresponding metal alkoxide vapors.

The term "substantially spherical", as used herein, is intended to define an equiaxed particle having a t/d ratio of greater than 0.7 where t equals the thickness of the particle and d equals the diameter of the particle.

The term "metal hydroxide", as used herein to define the hydrolysis reaction product of the metal alkoxide with water vapor, is intended to include metal oxides as well as the hydroxides of metal, including metal trihydroxides, i.e., a mixture which may include these materials.

Referring to the flow diagram of FIG. 1, a source of high purity non-reactive gas 2 which is oxygen and moisture free and which will, hereinafter, be referred to as nitrogen ($N_2$) for illustrative purposes only, is fed into line 10 which is connected, in turn, to mass flow controllers 12a, 12b, 12c and 12d, to permit adjustment of the flow of nitrogen gas therethrough. The $N_2$ gas, passing through controllers 12a and 12b, respectively, flows, via lines 14a and 14b, into nitrogen preheaters (only one of which is shown at 16b) where the nitrogen gas is heated to a temperature of from 100° to 250° C., preferably to about 130° to 150° C., before passing into vaporizers 20a and 20b. Vaporizers 20a and 20b and their associated piping represent duplicate apparatus placed in parallel for various reasons which will be described below. Since they are duplicates, the details of construction of only one of them will be described.

A source of metal alkoxide, such as, for example, aluminum alkoxide, is placed, in liquid form, in vaporizers 20a and 20b, respectively. Vaporizers 20a and 20b are heated to provide a temperature of about 100° to 250° C., preferably about 130° to 150° C., for the metal alkoxide vapor and nitrogen gas mixture which leaves the vaporizers via line 34.

In the illustrated embodiment, the nitrogen, passing through each of the alkoxide vaporizers, may have a flow rate of about 50 liters per minute. The amount of metal alkoxide liquid in alkoxide vaporizers 20a and 20b must, therefore, be sufficient to maintain a level of metal alkoxide liquid in the vaporizers above the outlets of the respective nitrogen inlet tubes, as shown in vaporizer 20b at 26b. The nitrogen inlet tubes are connected to porous fritted disks of sufficiently fine porosity to allow bubbling of nitrogen gas through the alkoxide liquid in bubbles of about ¼ ml to thereby saturate the nitrogen gas with alkoxide.

Nitrogen gas passes through mass flow controller 12d and then flows, via line 18, into a water vaporizer 60 which is maintained at a temperature of from 20° to 80° C., preferably about 40° to 45° C., and most preferably about 42° C. The nitrogen bubbles through high purity, deionized water to provide a heated nitrogen/water vapor mixture which exits vaporizer 60 via line 66 and it is blended with the metal alkoxide aerosol, as will be described below.

The amount of nitrogen flowing through mass flow controller 12d when 100 liters of $N_2$ per minute are flowing through the metal alkoxide liquid, should be about 10 liters per minute to provide a ratio of about 10 parts nitrogen passing through the metal alkoxide liquid per 1 part passing through the water to provide an acceptable metal alkoxide/water mixture in the gas/vapor streams upon subsequent merger in the hydrolysis zone to insure complete hydrolysis of the metal alkoxide. The amount of water vapor which will be blended with the aerosol in the hydrolyzer is in excess of the stoichiometric amount required to hydrolyze the alkoxide. Preferably, the amount of water vapor used is 4–5 times the stoichiometric amount needed for complete hydrolysis of the alkoxide.

Nitrogen flowing through mass controller 12c passes through line 38 to seed water vaporizer 40 into which also is fed a supply of water. The water used is a very high purity, deionized water. Water vaporizer 40 is maintained at room temperature and has a very low nitrogen flow rate therethrough, e.g., about 1 cubic centimeter (cc) per minute to provide a very small amount of water vapor in the nitrogen leaving seed vaporizer 40 at line 42. By using a very low nitrogen flow rate, a very small amount of water vapor is introduced into the nitrogen flow. This nitrogen/water vapor stream passes through line 42 to blend with the nitrogen/metal alkoxide vapors in line 34 which may, for example, have a flow of 35 liters per minute when the nitrogen flow through the seed water vaporizer is 1 cc per minute. The mixture then flows to condenser 50.

As the two streams blend together, the water vapor in the stream from line 42 reacts with the metal alkoxide vapors in the stream from line 34 to form seed nuclei of 0.01 micron particle size of metal hydroxide by the gas-gas hydrolysis reaction between the water vapor and the metal alkoxide vapor. This reaction provides a concentration of seed particles of about $10^5$ to $10^7$ nuclei per cc. The generation of seed nuclei can occur in line 34 which is kept hot, e.g., about 150° C. Alternatively, the seed-producing hydrolysis reaction may be accomplished in a separate, temperature controlled vessel.

It should be further noted that an increase in the concentration of seed nuclei to as high as $10^8$ nuclei per cc will increase the aerosol production rate and lower the liquid wall losses in the condenser thus increasing the powder yield in the hydrolyzer.

This mixture of nitrogen/metal alkoxide/metal hydroxide seed nuclei then passes into condenser 50 which is cooled by an external cooling source (not shown) to a temperature of from −40° C. to +40° C., preferably approximately +2° C., which causes the metal alkoxide vapors to condense on the metal hydroxide seed nuclei to form a aerosol comprising a fine mist of metal alkoxide (on metal hydrate seed) dispersed in the nitrogen gas. The residence time of the aerosol in condenser 50 is from 0.1 to 1.0 second, preferably about 0.2 second. The ratio of the aerosol flow to the water vapor flow is about 5:1. For example, if the aerosol flow into the condenser is about 35 liters per minute, the water vapor flow should be about 7 liters per minute. The aerosol then leaves condenser 50 through a liquid trap 52 from which the vapors pass, via line 56, into first hydrolyzer 70 where it blends with the stream of nitrogen gas in line 66 which is saturated with water vapor. Liquid alkoxide from trap 52 is collected at 54.

Hydrolysis chamber 70 is maintained at a temperature of 50° C. by heating mantle 72. The metal alkoxide aerosol reacts with the water vapor to hydrolyze the metal alkoxide to the corresponding metal hydroxide. Typical residence time in hydrolysis chamber 70 may be about 1 to 2 seconds, preferably about 1.5 second.

The nitrogen gas/water vapor and metal hydroxide particles then exit hydrolyzer 70 via line 74 to a second hydrolyzer 76 maintained at ambient temperature to complete the hydrolysis reaction. The mixture then flows into filter 82 where the solids, i.e., the metal hydroxides, are collected. The solids may be sent to a calcination stage (not shown) where the metal hydroxides are calcined at a temperature of 1100° C. for 4 hours to form the corresponding metal oxide. In the case of aluminum alkoxide, alpha alumina is produced under these conditions. The nitrogen, water vapors and alkanol vapors exit at line 86 where they may be subject to further processing to recover and recycle the alkanol and nitrogen values, if desired, or simply vented to a collection hood.

The flow of the mixture of nitrogen/metal alkoxide vapors/seed nuclei/water vapor in line 34 entering condenser 50 is sufficiently high to produce a turbulent flow to provide for interaction between the metal alkoxide vapor and the water vapor to provide the hydrolysis reaction generating the seed nuclei. Typically, the flow should be sufficient to provide a Reynolds number of greater than 2,000, and preferably more than 10,000. The Reynolds number is calculated as follows:

$$Re = dvp/u$$

where:
Re = Reynolds number (dimensionless)
d = inside tube diameter in cm
v = gas velocity in cm/sec
p = gas density in grams/cc
u = gas viscosity in poise In accordance with one aspect of the invention, this turbulent flow is maintained in exit line 56 from condenser 50, as well as in hydrolyzer 70, to obtain proper mixing of the streams from lines 56 and 66 and completion of the hydrolysis reaction within hydrolyzer 70.

In the practice of the invention, a metal hydroxide/oxide powder having more than one predominant particle size may be produced by providing liquid alkoxide in hydrolyzer 70, as shown at 24, either through coalescence of some of the aerosol as it enters hydrolyzer 70 from line 56 or by deliberately feeding liquid alkoxide into hydrolyzer 70 from an external source 90 via line 92, as shown in FIG. 1. In either instance, the liquid alkoxide is vaporized by heater 72, and the vapor reacts with the water vapor entering hydrolyzer 70 via line 66 to form smaller particles.

Figure 2:
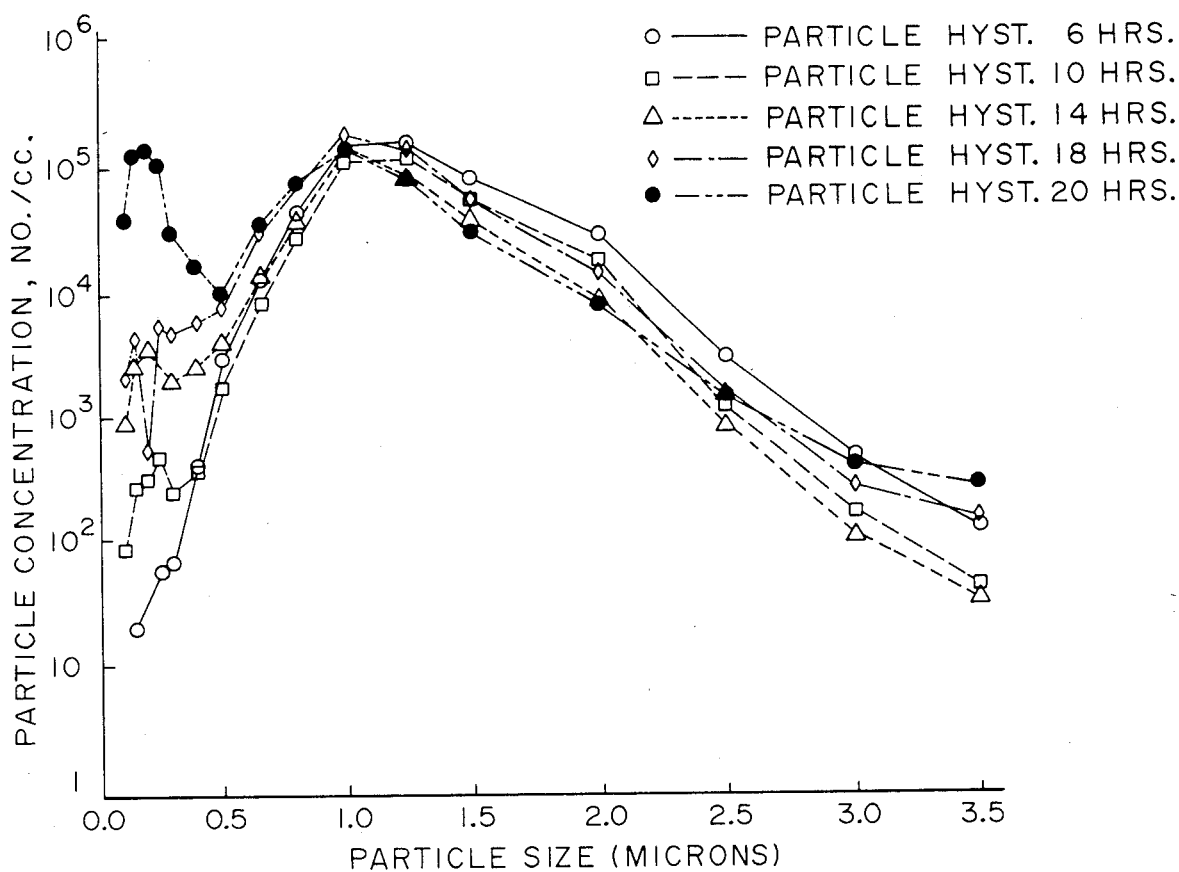
FIG. 2 is a graph showing a bimodal distribution of the substantially spherical particles of the invention.
Figure 3:
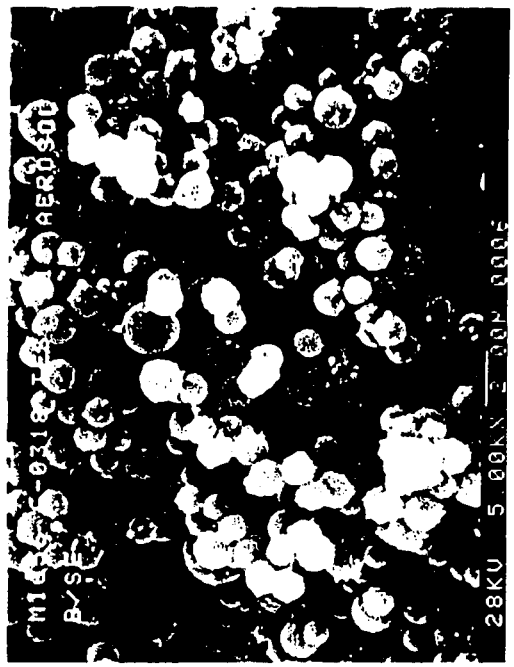
FIG. 3 is photomicrographs illustrating the bimodal particle distribution graphed in FIG. 2 at 10k and 5k magnifications.
Figure 3:
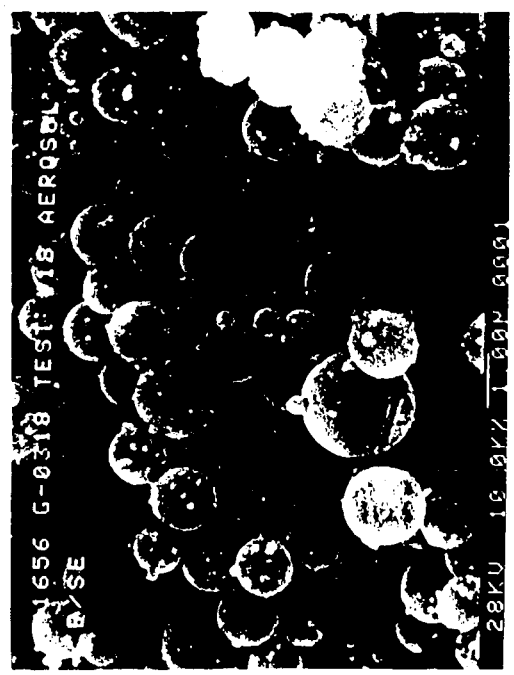

The graph of FIG. 2 shows a bimodal particle size distribution achieved by operating the process for 20 hours to permit accumulation of liquid alkoxide in hydrolyzer 70 by coalescence of liquid alkoxide from the aerosol stream. Note that the particles have two distinct particle size concentrations at about 0.2 micron and 1 micron. This particle size distribution is further depicted in the photomicrograph of FIG. 3.

Figure 4:
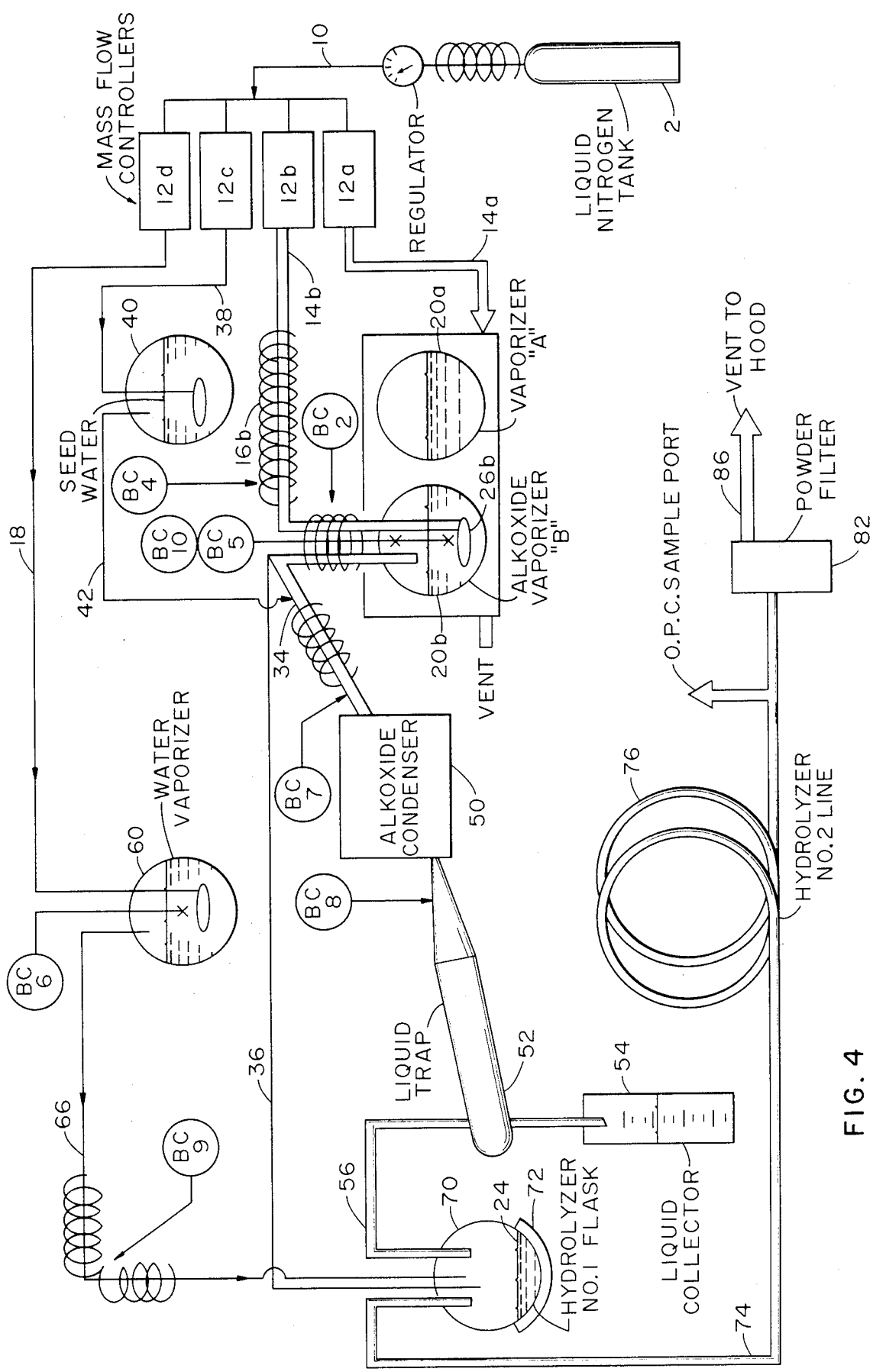
FIG. 4 is a diagrammatic flowsheet illustrating another embodiment of the process of the invention.

Turning now to FIG. 4, another embodiment of the invention is illustrated. In this embodiment, some of the alkoxide vapor from vaporizer 20b is conveyed directly to hydrolyzer 70 via line 36 bypassing condenser 50. This provides an alternate source of alkoxide vapor in hydrolyzer 70 in lieu of heating the coalesced alkoxide liquid in the bottom of hydrolyzer 70 to provide the alkoxide vapors to produce the second particle size of metal hydroxide/oxide.

Figure 5:
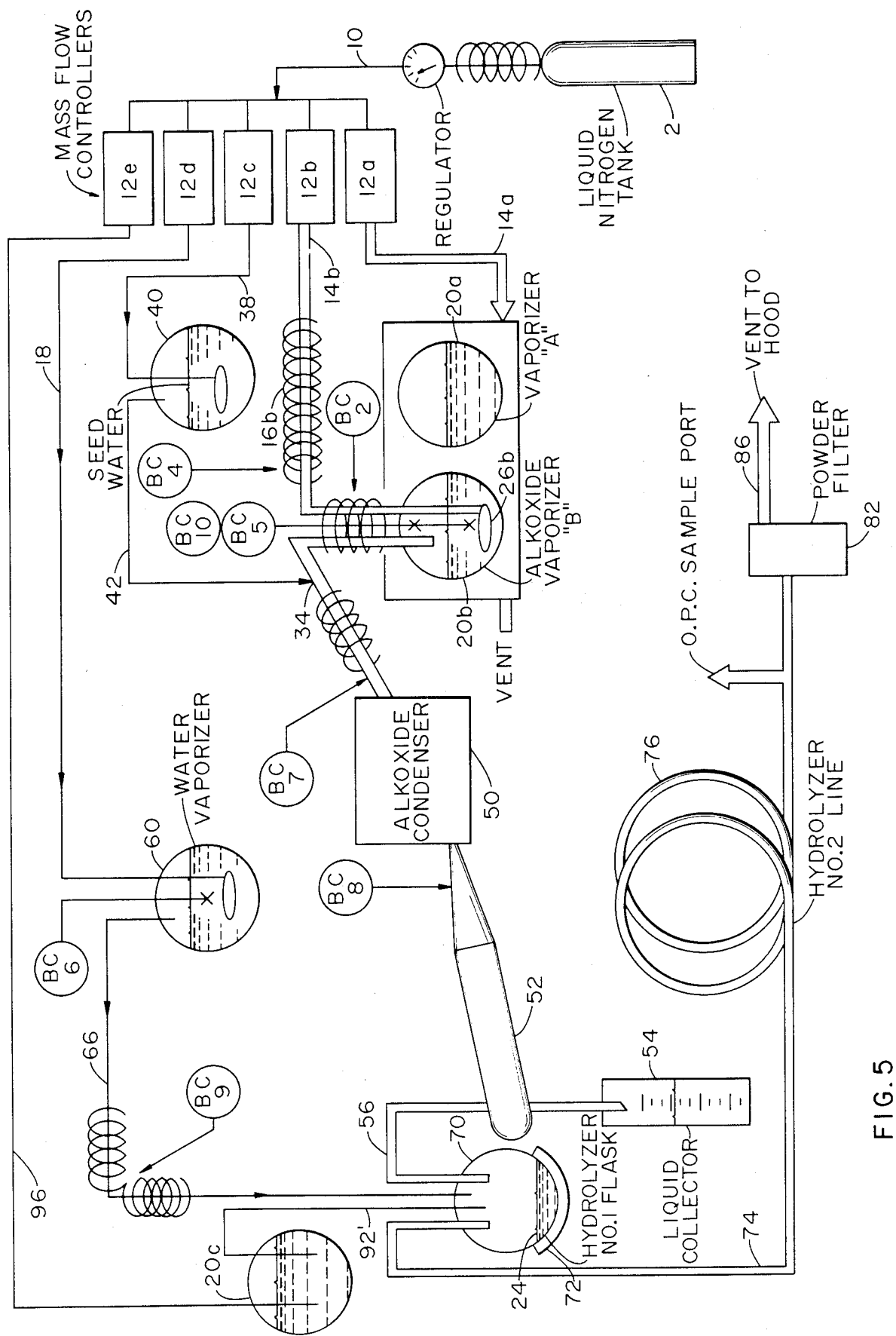
FIG. 5 is a diagrammatic flowsheet illustrating yet another embodiment of the process of the invention.

In FIG. 5, yet another embodiment is shown in which another nitrogen controller 12e controls the flow of nitrogen through line 96 to a vaporizer 20c which contains liquid metal alkoxide to provide an independent source of metal alkoxide vapors which are fed directly into hydrolyzer 70 via line 92' without forming an aerosol. As in the embodiment of FIG. 4, this provides a second source of hydrolyzable metal alkoxide material in hydrolyzer 70 to thereby provide a second predominant particle size in the final product.

To obtain a metal hydroxide/oxide particle size mixture comprising more than two predominant particle sizes, e.g., a trimodal distribution, the embodiments of FIGS. 1, 4 and 5 may be combined. To vary the amount of each particle size, the flow rates may be adjusted to either increase or decrease the amount of each of the particle sizes as desired.

Figure 6:
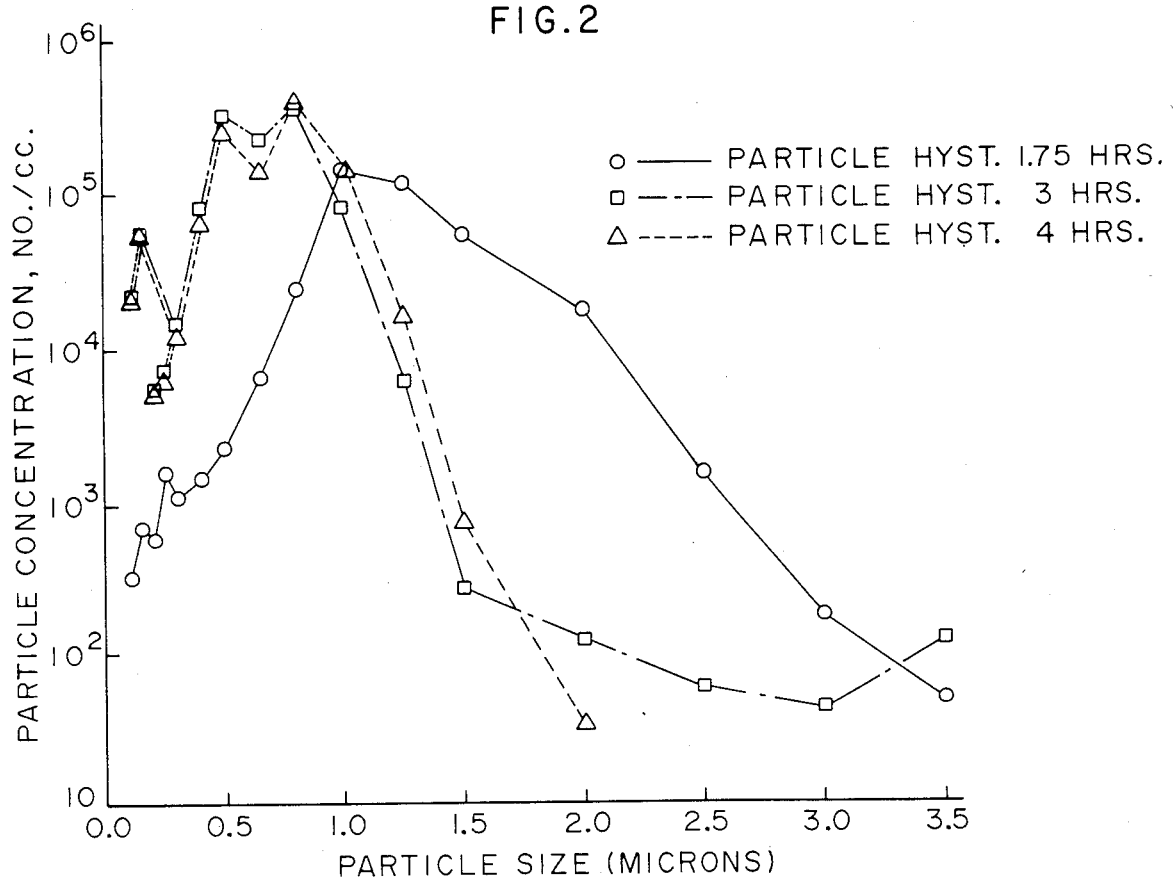
FIG. 6 is a graph showing a trimodal distribution of the substantially spherical particles of the invention.
Figure 7:
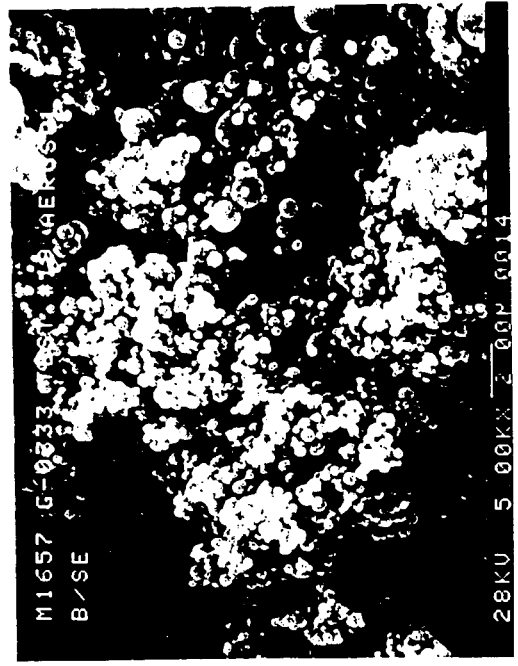
FIG. 7 is photomicrographs illustrating the bimodal particle distribution graphed in FIG. 6 at 10k and 5k magnifications.
Figure 7:
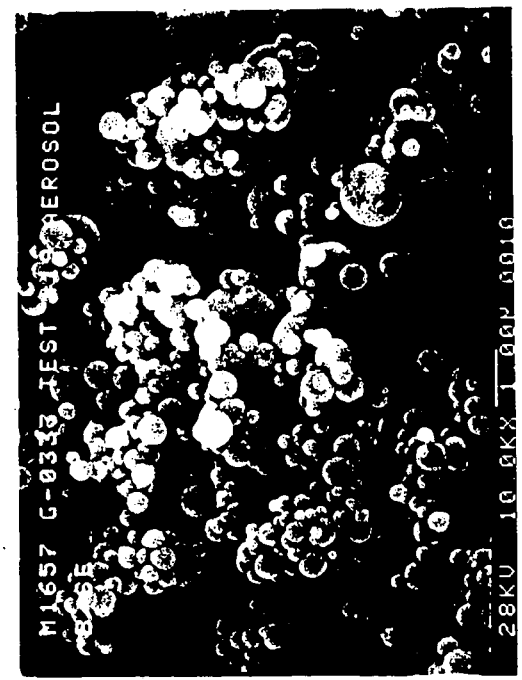

FIG. 6 graphs a run having three distinct particle size peaks, i.e., a trimodal distribution of predominant particle sizes. Such a particle size mixture is shown in the photomicrograph of FIG. 7.

In accordance with a further aspect of the invention, the substantially spherical metal hydroxide/oxide particles may comprise a single metal hydroxide or a mixture of metal hydroxides. A mixture may be obtained by mixing together several miscible metal alkoxide liquids before introducing the mixture into the vaporizer. Alternately, the liquid metal alkoxides may be vaporized in separate vaporizers and the metal alkoxide vapors mixed together. This latter method may be preferred when working with two or more liquid metal alkoxides which do not vaporize at the same rate at a common temperature. More close control of the desired ratios of the respective metal hydroxides in the final product can then be achieved. For example, in FIGS. 1, 4 and 5, two vaporizers, 20a and 20b, are illustrated. When only using one metal alkoxide starting material, both vaporizers may be operated under identical conditions with the use of two vaporizers serving only to permit increased throughput as well as a backup should it be necessary to service one of the vaporizers. However, if it is desired to form a metal hydroxide blend from more than one metal alkoxide material, one of the vaporizers may be filled with one liquid metal alkoxide and the other vaporizer may be filled with a second liquid metal alkoxide. The operating temperatures and the nitrogen flow through each of the vaporizers may then be adjusted to provide the desired ratio in the final substantially spherical metal hydroxide particle.

Figure 8A:
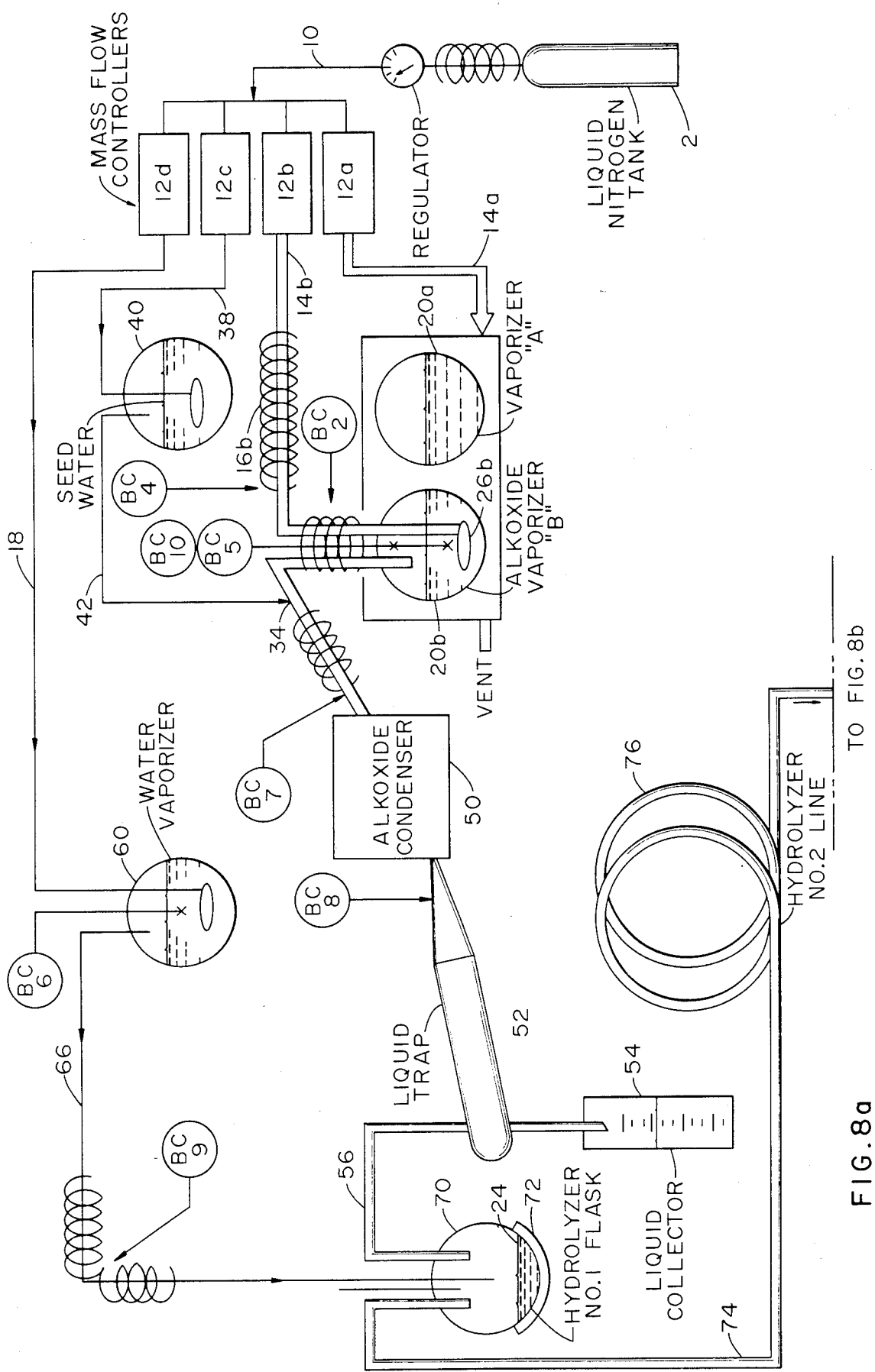
FIGS. 8a and 8b are diagrammatic flow sheets of yet another embodiment of the invention.
Figure 8B:
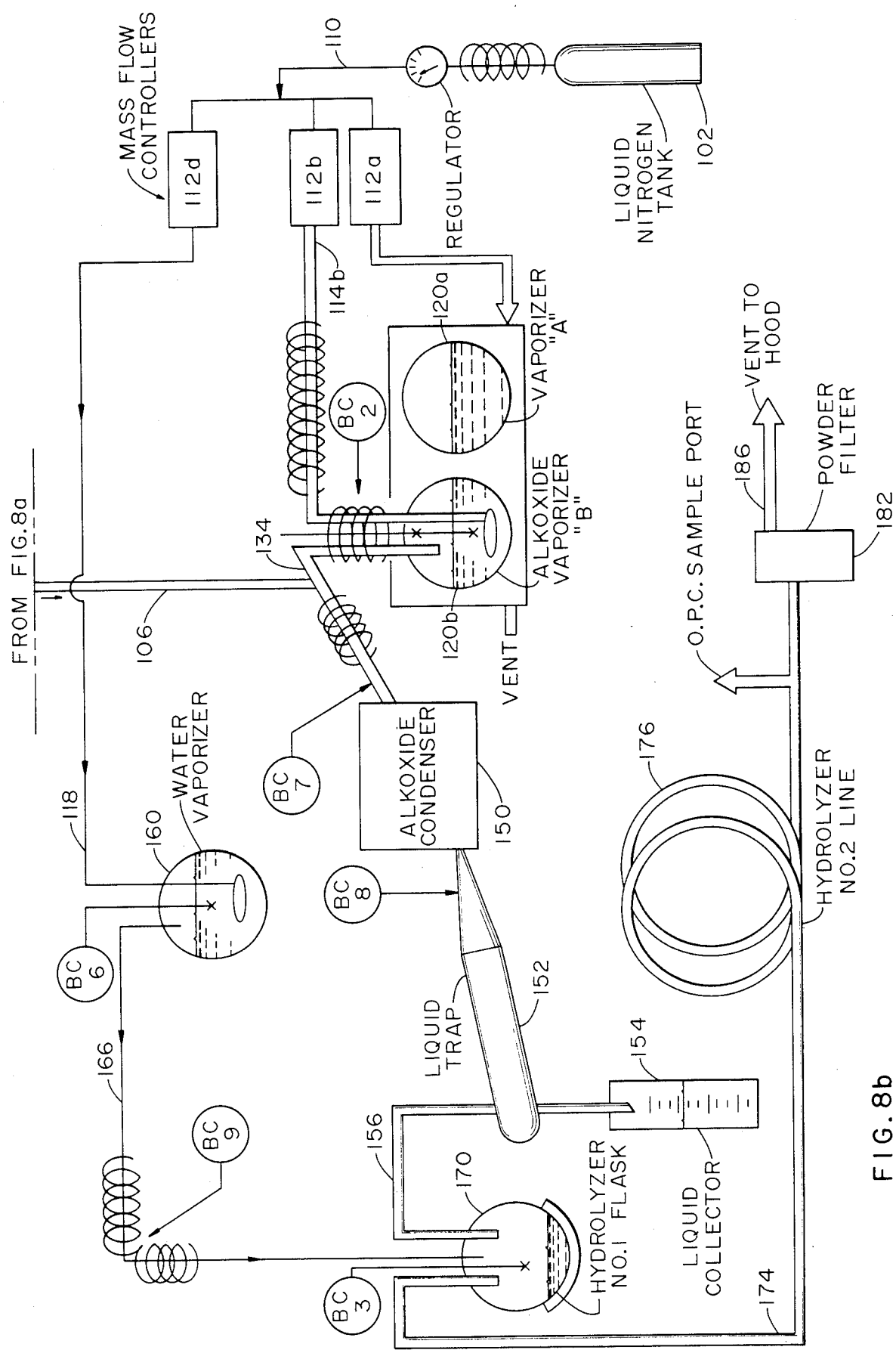

In FIG. 8, yet another embodiment of the invention is illustrated for making substantially spherical metal hydroxide particles from more than one liquid metal alkoxide source wherein one of the metal hydroxides forms a core or central portion and the other metal hydroxide forms a shell or outer layer around the inner portion. This is accomplished by first forming metal hydroxide particles in similar fashion to that described in FIG. 1 and then taking the gas/particle mixture and feeding it into a second apparatus through a feed line 106 to blend, in line 134, with alkoxide vapors coming from vaporizers 120a and 120b into which nitrogen gas from a source 102 is bubbled via line 110 and controllers 112a and 112b.

The fine metal hydroxide powder entering this portion of the apparatus through line 106 functions as seed material as the blended stream enters condenser 150 causing an aerosol to form comprising the vapors of the second metal alkoxide condensed on the solid metal hydroxide powder formed from the first metal alkoxide. This aerosol is then passed to hydrolyzer 170 via liquid trap 152 from which the liquids are removed in liquid container 154. The aerosol is at least partially hydrolyzed in hydrolyzer 170 by reaction with water vapor which enters hydrolyzer 170 via line 166 from vaporizer 160 in which nitrogen from source 110 flows via controller 112d and line 118. The at least partially hydrolyzed material is then passed on to hydrolyzer 176 via line 174 where the hydrolysis reaction is completed and the two layered powder is collected in filter 182 with the gases and water vapor exiting through line 186.

Thus, the invention provides for the formation of substantially spherical particles of one or more metal hydroxides in controlled particle distributions using turbulent flow conditions to produce particles having one or more predominant particle sizes.

While we do not wish to be bound by any particular theory of operation, it would appear that the reason turbulent flow conditions may be maintained, and indeed, actually are preferred, in the present invention (even though prior art users cautioned against such turbulent flow and instead attempted to maintain laminar flow) may be due to the use of seed nuclei comprising the same material as is generated in the hydrolyzer, thus resulting in a more uniform particle size distribution than was previously thought possible by others relying on either homogeneous nucleation or on the use of seed particles of impurities such as AgCl. In this regard, it has been also noted that while a substantial amount of alkoxide vapor may be lost to the condenser wall with turbulent flow, compared to laminar flow, this amount is reduced when using the seeding process of the invention.

In any event, the maintenance of a turbulent flow permits a high throughput resulting in higher yields without compromising the purity or the size uniformity of the resultant product due to the use of the same seed material as the hydrolysis product. Furthermore, the use, in a turbulent flow reaction, of the seed nuclei produced in accordance with the invention nearly doubles the powder production rate in contrast to the same reaction without the use of such seed nuclei. It will be recognized, however, that under certain conditions, either to achieve certain particle size mixes or to achieve a different size or thickness in the multiple layer particles described and claimed herein made using more than one metal alkoxide, the use of laminar flow conditions either to achieve one of the particle sizes or one of the metal hydroxide layers may be tolerated.

Having thus disclosed the invention, what is claimed is:

1. A process for the production of high purity substantially spherical metal hydroxide particles comprising a mixture of at least two predominant particle sizes which comprises:
   (a) forming a metal alkoxide vapor from a first metal alkoxide in a first vaporization zone;
   (b) cooling the metal alkoxide vapor sufficiently in a condensation zone to form an aerosol comprising finely divided condensed metal alkoxide;
   (c) hydrolyzing said metal alkoxide aerosol, while maintaining said aerosol under a turbulent flow condition, in a hydrolysis zone by contact with water vapor to hydrolyze said metal alkoxide to form substantially spherical metal hydroxide particles of a first particle size, and
   (d) contacting said water vapor in said hydrolysis zone with a second alkoxide metal vapor, to form at least one additional distinct and different particle size of said substantially spherical metal hydroxide particles from the particle size produced in step (c).

2. The process of claim 1 including the further step of forming said second alkoxide vapor by vaporizing liquid alkoxide which accumulates in the bottom of a hydrolyzer.

3. The process of claim 1 including the further steps of forming said second alkoxide vapor by introducing alkoxide liquid into the bottom of a hydrolyzer.

4. The process of claim 1 including the further steps of forming said second alkoxide vapor in a separate vaporization zone.

5. The process of claim 1 wherein said second alkoxide vapor comprises the metal alkoxide vapor which has not been condensed in said condensation zone.

6. A process for the production of high purity substantially spherical metal hydroxide particles comprising a mixture of at least two different and distinct metal hydroxide particles which comprises:
   (a) forming a first metal alkoxide vapor from a first metal alkoxide liquid in a first vaporization zone;
   (b) forming at least one additional metal alkoxide vapor from a different metal alkoxide liquid in a vaporizaton zone;
   (c) cooling one of said metal alkoxide vapors sufficiently in a condensation zone to form an aerosol comprising finely divided condensed metal alkoxide; and (d) hydrolyzing both said metal alkoxide vapor and said aerosol in a hydrolysis zone by contact with water vapor to form said mixture of substantially spherical metal hydroxide particles of two different and distinct size, said mixture containing a plurality of different metal hydroxides.

7. A process for the production of high purity substantially spherical metal hydroxide particles comprising a mixture of at least two different and distinct metal hydroxide particles which comprises:
(a) forming a first metal alkoxide vapor from a first metal alkoxide liquid in a first vaporization zone;
(b) forming at least one additional metal alkoxide vapor from a different metal alkoxide liquid in a vaporization zone;
(c) mixing said one additional metal alkoxide vapor with said first metal alkoxide vapor;
(d) cooling said mixed metal alkoxide vapors sufficiently in a condensation zone to form an aerosol comprising finely divided condensed metal alkoxide; and
(e) hydrolyzing said aerosol in a hydrolysis zone by contact with water vapor to form said mixture of substantially spherical metal hydroxide particles of two different and distinct sizes, and said mixture containing a plurality of different metal hydroxides.

8. A process for the production of high purity substantially spherical metal hydroxide particles comprising a mixture of at least two different and distinct metal hydroxide particles which comprises:
(a) mixing two different metal alkoxide liquids;
(b) forming a metal alkoxide vapor from said mixed metal alkoxide liquids in a vaporization zone;
(c) cooling said metal alkoxide vapor sufficiently in a condensation zone to form an aerosol comprising finely divided condensed metal alkoxide; and
(d) hydrolyzing said aerosol in a hydrolysis zone by contact with water vapor to for said mixture of substantially spherical metal hydroxide particles of two different and distinct sizes, said mixture containing plurality of different metal hydroxides.

9. A process for the production of high purity substantially spherical metal hydroxide particles comprising a core of a first metal hydroxide and at least one layer of a different metal hydroxide surrounding said core which comprises:
(a) forming a first metal alkoxide vapor in a first vaporization zone;
(b) cooling said first metal alkoxide vapor sufficiently in a condensation zone to form a first aerosol comprising finely divided condensed metal alkoxide;
(c) hydrolyzing said first metal alkoxide aerosol in a hydrolysis zone by contact with water vapor to hydrolyze said metal alkoxide to form a substantially spherical metal hydroxide particles;
(d) forming a second metal alkoxide vapor in a second vaporization zone;
(e) mixing said second metal alkoxide vapor with said substantially spherical metal hydroxide particles formed from said first aerosol and cooling the formed mixture to form a second aerosol comprising substantially spherical metal hydroxide particles formed from said first aerosol and condensed metal alkoxide from said second metal alkoxide vapor; and
(f) hydrolyzing said second metal alkoxide aerosol in a hydrolysis zone by contact with water vapor to hydrolyze said second metal alkoxide;
whereby substantially spherical metal hydroxide particles are formed comprising said core containing said first metal hydroxide and a layer of a second metal hydroxide surrounding said core.

* * * * *